May 24, 1966 W. L. TORGESON 3,252,323
PARTICULATE SAMPLING DEVICE
Filed Dec. 29, 1961 5 Sheets-Sheet 2
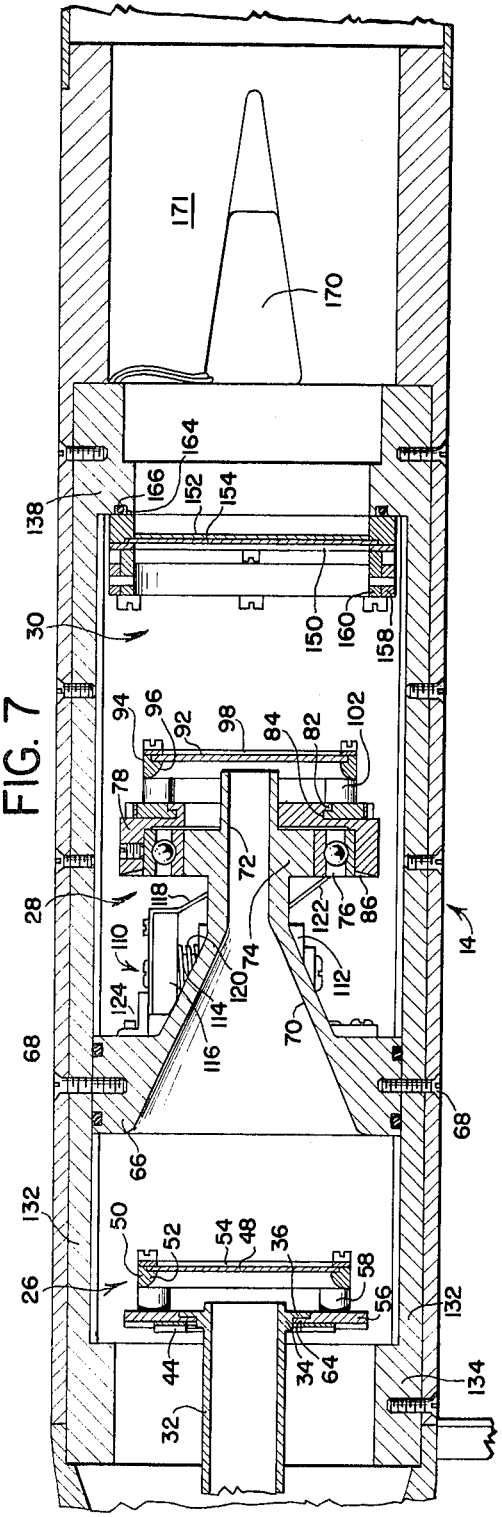
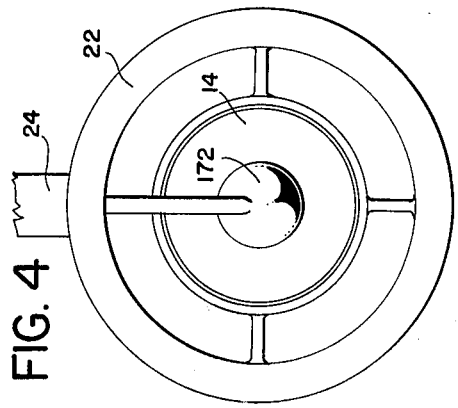
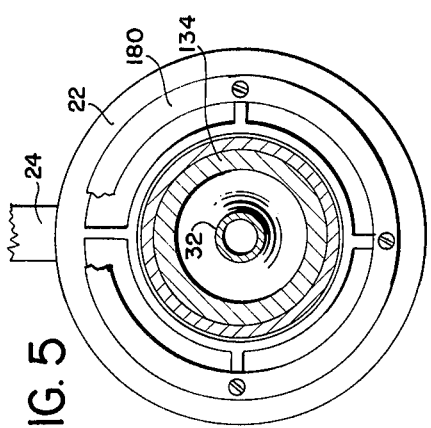
INVENTOR.
WILLIAM L. TORGESON
BY *Allen M. Sutton*
ATTORNEY

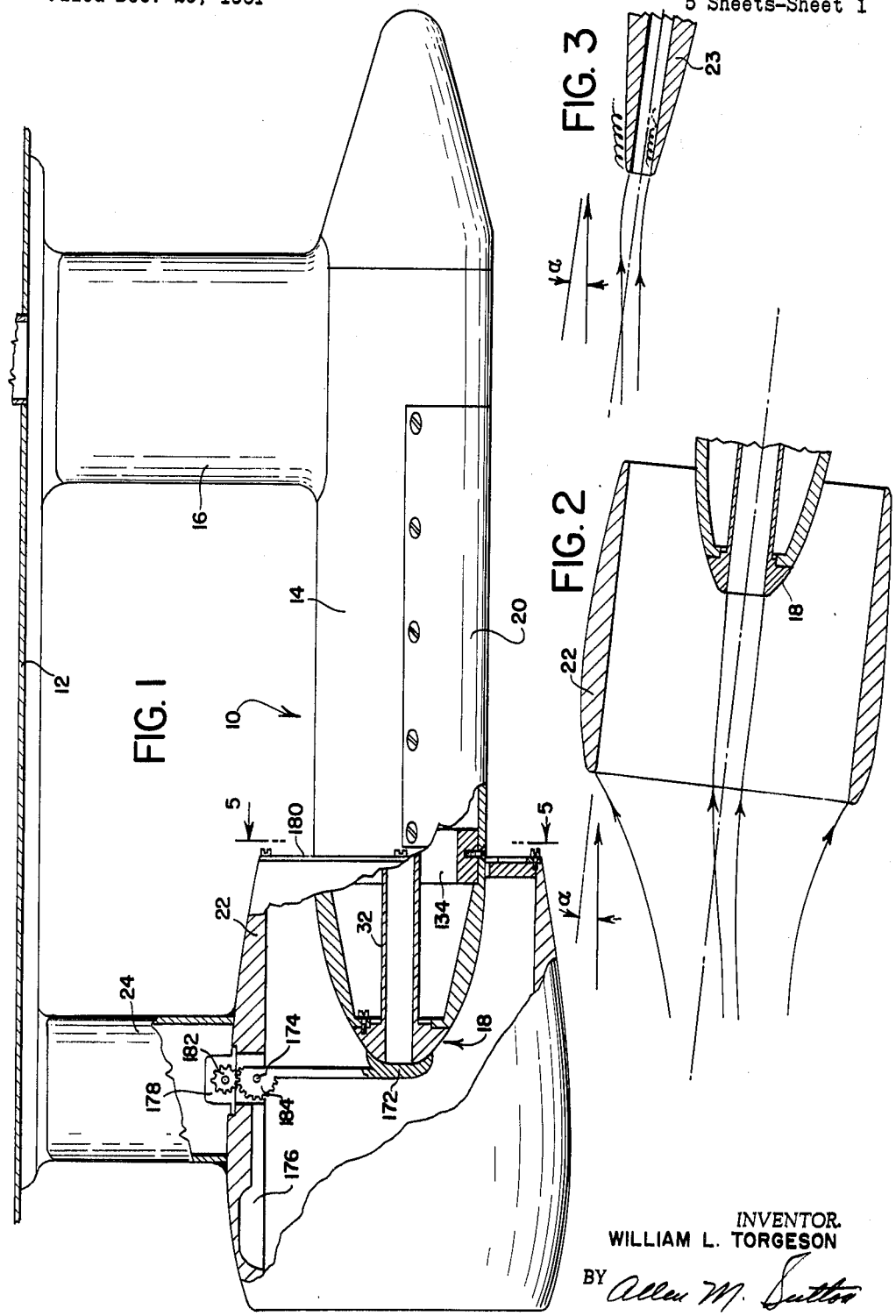

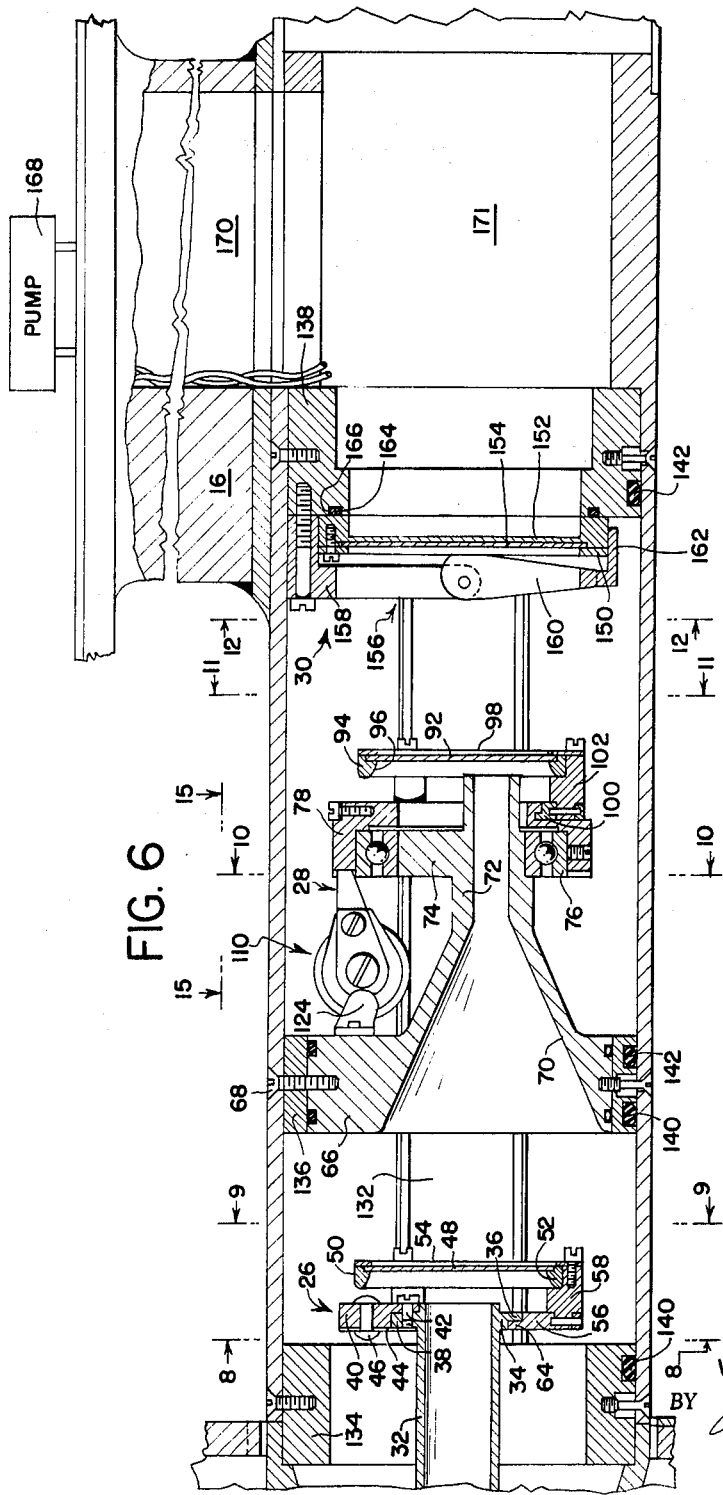

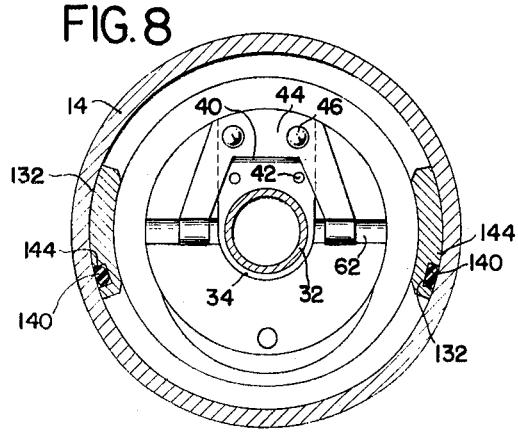
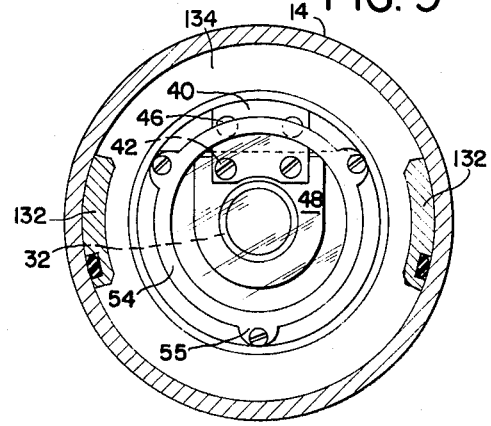
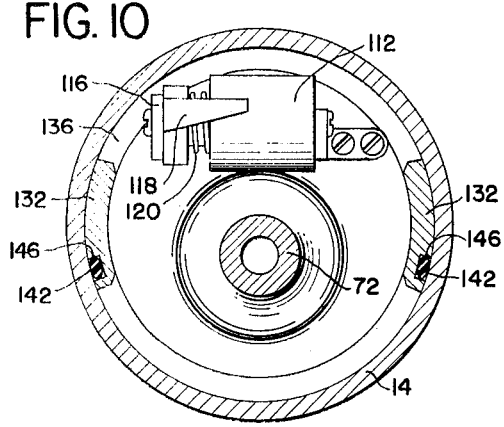
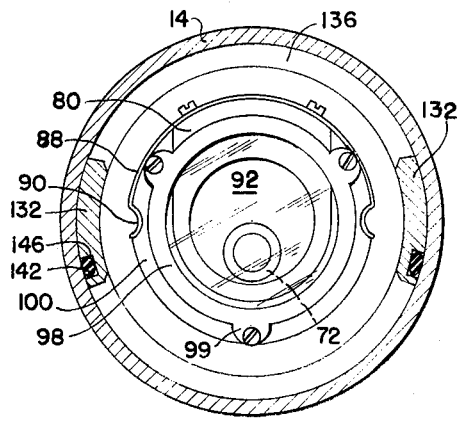
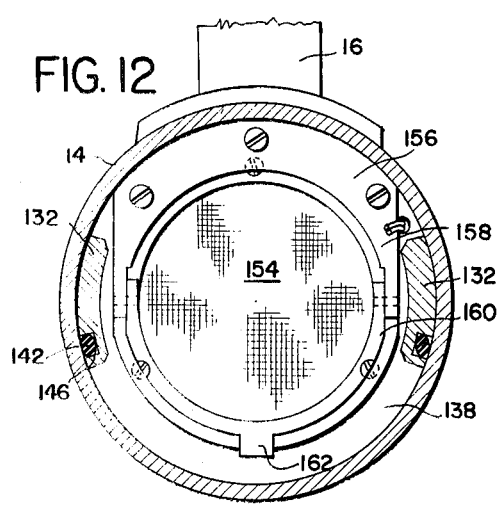

May 24, 1966 W. L. TORGESON 3,252,323
PARTICULATE SAMPLING DEVICE
Filed Dec. 29, 1961 5 Sheets-Sheet 5

INVENTOR.
WILLIAM L. TORGESON
BY Allen M. Sutton
ATTORNEY

United States Patent Office 3,252,323
Patented May 24, 1966

3,252,323
PARTICULATE SAMPLING DEVICE
William L. Torgeson, Minneapolis, Minn., assignor, by mesne assignments, to Litton Systems, Inc., Beverly Hills, Calif., a corporation of Maryland
Filed Dec. 29, 1961, Ser. No. 163,275
17 Claims. (Cl. 73—170)

The present invention pertains to a device for sampling air, and more particularly to a sampling device for collecting particulate material or debris contained in the atmosphere, under isokinetic inlet conditions, that is, without size discrimination in the inlet airstream.

Pollution of the atmosphere by various undesirable and toxic contaminants, such as noxious gases, radioactive material, and the like, has increased the necessity of providing devices for determining the concentration of particles of contamination and of the particle size distribution of such contaminants in the atmosphere. Various systems have been devised in order to collect a sample of air containing particulate material or debris from a particular atmospheric region, so that this sample might be subsequently analyzed in order to determine the presence and amount of certain constituents. As used herein, the term particulate material is used interchangeably with atmospheric debris.

One type of sampling system presently used includes an inflatable envelope or bag adapted to be attached to an inflatable balloon. As the balloon ascends into the atmosphere and attains a predetermined altitude, the ambient air is collected within the bag through an opening or mouth in the bag. The contents of the bag are thereafter analyzed to determine the material collected therein. The use of this type of particulate collection system is somewhat limited because collection of the sample is best made during the ascent of the balloon; the rate of ascent will generally permit the air to be forced into the bag at a satisfactory rate, whereas a satisfactory flow rate is difficult to attain while the balloon is floating in the atmosphere at a substantially constant altitude.

Another type of sampling system is one which collects the particulate material by impaction on a plate or slide, or by filtration in a filter, as the air and the sampler move with respect to each other at relatively high speeds. The material collected on the plate, slide or filter is subsequently analyzed. The relative movement required by the system might be accomplished either by imparting motion to the air being sampled or by imparting motion to the system doing the sampling. A possible shortcoming of this type of sampling system is that particle size discrimination in the inlet airstream of the sampling device might occur; this is caused by the relative movement involved, the difference in shape and inertia of the several sizes of particles, the size of the sampler inlet, the angle of attack of the sampler relative to the airstream, etc. Consequently a true sample, containing both the correct size distribution and concentration of particles in a particular region being sampled, might not be obtained. Another consideration is that it might be difficult to obtain flow conditions in the inlet of the sampling device which are favorable to proper performance of the collection unit located within the sampling device. In order to obtain proper flow conditions in the inlet of the sampling device and to obtain a true representative sample, sampling should be conducted isokinetically; that is, the sample of particulate material should be drawn into the sampling system at a substantially constant velocity, and at a velocity which substantially matches the speed of the sampling device relative to the region being sampled, so that there is no particle size discrimination in the inlet airstream.

Accordingly, one object of the present invention is to provide an improved sampling device.

Another object is to provide a sampling device for collecting particulate material or atmospheric debris under isokinetic inlet conditions.

A further object is to provide a sampling device which will collect particulate material without particle size discrimination in the inlet airstream, for a wide range of flight conditions.

A still further object is to provide a sampling device for collecting particulate material having means for obtaining flow conditions in the inlet of the sampling device which will be favorable for proper performance of the collection means located within the device.

Another object is to provide a particulate sampling device which will operate isokinetically even though the sampling device might be required to operate at an angle of attack.

A still further object is to provide a particulate sampling device having means for protecting the inlet of the device and for preventing the collection of particulate material on the inlet of the device.

Preferably, the sampling device of this invention is comprised of an aerodynamically-shaped probe having an inlet in one end for permitting the entrance of a sample of air containing particulate material or atmospheric debris, also referred to as an aerosol, into the probe. For best results, the probe is adapted to be attached to an airplane, rocket, or other high speed airborne vehicle. However, it is envisioned that the probe might be mounted in a stationary position and means provided for causing the sample of air to move relative to the probe. Positioned within the probe is at least one collection unit which is adapted to collect the particulate material contained in the sample of air. A tubular cowling which surrounds the inlet end of the probe is provided for controlling the flow of the aerosol into the probe so as to avoid particle size discrimination in the inlet airstream for a wide range of flight conditions, as well as to obtain flow conditions in the inlet of the probe which are favorable to proper performance of the collection unit.

Other objects and advantages of the invention will become apparent from a consideration of the following specification and accompanying drawings, wherein:

FIGURE 1 is a side elevational view, partly in section, of an embodiment of the invention attached to the fuselage of an airplane;

FIG. 2 is a diagrammatic sectional view illustrating the entrance of a stream of air into a sampling device provided with a cowling which surrounds the inlet of the device;

FIG. 3 is a diagrammatic sectional view illustrating the entrance of a stream of air into another type of sampling device;

FIG. 4 is a front elevational view of the sampling device illustrated in FIG. 1;

FIG. 5 is a sectional schematic elevational view of the sampling device taken along line 5—5 of FIG. 1;

FIG. 6 is an enlarged longitudinal sectional view, taken from the side of a portion of the sampling device illustrated in FIG. 1;

FIG. 7 is a view similar to that of FIG. 6, but taken from the bottom of the sampling device;

FIG. 8 is a cross-sectional view taken along line 8—8 of FIG. 6, illustrating the front of a first stage impactor unit;

FIG. 9 is a cross-sectional view taken along line 9—9 of FIG. 6 illustrating the back of the first stage impactor;

FIG. 10 is a cross-sectional view taken along line 10—10 of FIG. 6;

FIG. 11 is a cross-sectional view taken along line 11—11 of FIG. 6, illustrating the back of a second stage impactor unit;

FIG. 12 is a cross-sectional view taken along line 12—12 of FIG. 6, illustrating the front of a filter unit;

Figure 14:
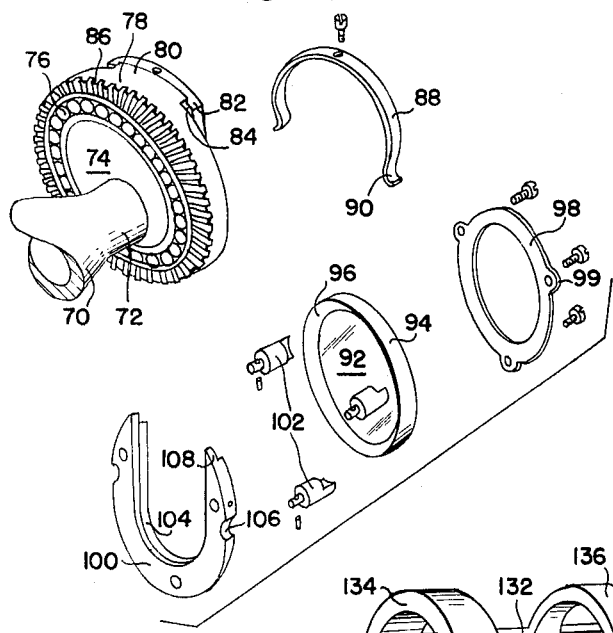
FIG. 14 is an exploded perspective view illustrating the second stage impactor.

FIG. 1 illustrates a sampling device designated generally by reference numeral 10, attached to the fuselage 12 of an airplane. The sampling device 10 includes an aerodynamically-shaped probe 14 which is attached to the airplane by a support member 16. The probe 14 has an inlet designated generally by numeral 18 at its forward end, which permits the entrance of air containing particulate material or atmospheric debris into the probe 14. Positioned within the probe 14 is at least one particulate collection unit (not shown in FIG. 1) which will be described hereinafter. A door 20 is provided for gaining access into the interior of the probe 14. Surrounding the forward end of the probe 14 is an aerodynamically-shaped tubular cowling 22 which is connected to the airplane 12 by a support member 24. In this regard, it is envisioned that effective sampling might be accomplished by mounting the sampler 10 in a stationary position, and providing a system for moving the aerosol relative to the sampler, as well.

In view of the high speeds obtainable with an aircraft, the sample which is being collected is forced into the probe 14 through the inlet 18 by ram pressure. Due to the high velocity and pressure involved, proper performance of a sampling device is often difficult to obtain. Therefore, the sampling device 10 is designed to permit collection and fractionation (i.e. collection in several size ranges) of particulate material or atmospheric debris regardless of the speed involved, and under isokinetic inlet conditions. The cowling 22 is provided in order to control the flow of the airstream containing the particulate material through the inlet 18 into the probe 14 in a manner to avoid particle size discrimination in the inlet air stream, and to obtain flow conditions in the inlet of the probe 14 which are favorable to proper performance of the collection unit located within the probe, under a wide range of operating conditions. Further, in view of the aerodynamically-shaped cowling 22, an efficient ram pressure recovery is obtainable; i.e., the pressure within the cowling, in the region of the inlet 18, is greater than the ambient pressure, and an effective pump for moving the aerosol through the sampler is achieved. The cowling 22 also aids in preventing the particulate material from collecting on the inlet of the probe and assures proper collection of the material, even though the sampler might be required to operate at an angle of attack relative to the airstream.

FIG. 2 illustrates the nature of the flow ahead of and within the cowling 22, as compared with the inlet airstream for another type of high-speed inlet 23 illustrated in FIG. 3. As the airplane passes through the atmosphere, considerable variations in the angle of attack α might occur. Consequently, a curvature of the inlet airstream results, and it is difficult to obtain a true sample. As illustrated in FIG. 2, the cowling 22 controls and directs the inlet airstream so that proper performance of the sampler is assured and a true sample is collected.

Although the high-speed inlet 23 of the device shown in FIG. 3 might be operated isokinetically at zero angle of attack, there is no assurance that size discrimination can be avoided at positive or negative angle of attack in view of the curvature of the inlet airstream. Note also that the inlet itself of the sampling device depicted in FIG. 3 might become a very good particle collector because of the high velocity of the inlet flow, coupled with the small radius of curvature of the inlet lip and the appreciable curvature of the inlet flow airstream at an angle of attack α. The result of using such a sampling device is that some sizes and shapes of the particulate material or atmospheric debris being sampled will be drawn into the device more readily than others, and a true representative sample will not be obtained.

Figure 16:
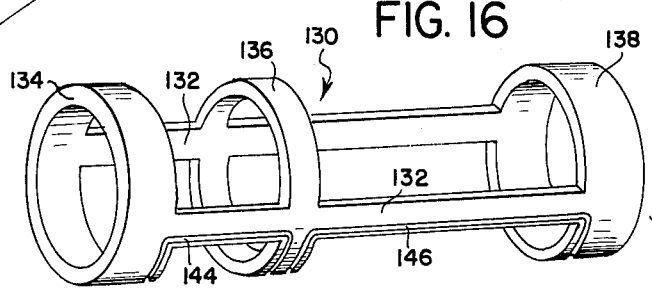
FIG. 16 is an exploded perspective view illustrating a framework which fits inside the sampling device.

The probe 14 of FIG. 1 is provided with a plurality of units for collecting the particulate material or atmospheric debris, which are best seen in the side and bottom views of FIGS. 6 and 7, respectively, of the interior of the probe. Secured within the probe 14 is a framework designated by the numeral 130 (also see FIG. 16). The framework 130 is comprised of two elongated bars 132 which extend longitudinally within the probe, and three circular bands 134, 136, and 138 which are integrally connected to the bars 132. Some of the hardware within the probe 14 is adapted to be attached to the framework 130, and the door 20 is likewise attachable to the framework. An air-tight seal is maintained around the door 20 by inserting O-rings 140 and 142 within channels 144 and 146, respectively, in the framework 130 (FIG. 16).

The probe 14 is provided with a first stage impactor unit 26, a second stage impactor unit 28, and a filter unit 30. Each collection unit is designed to collect particulate material within a prescribed size range. For example, the first stage impactor 26 might be designed to collect particulate material having a diameter of 1.0 micron or larger; the second stage impactor 28 might be designed to collect material having a diameter ranging between 0.3 micron and 1.0 micron; and the filter 30 might be designed to ensure collection of particulate material having a diameter below 0.3 micron.

Figure 13:
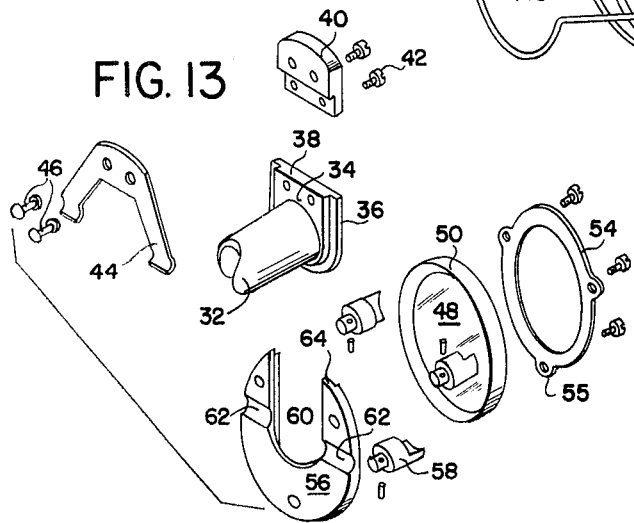
FIG. 13 is an exploded perspective view illustrating the first stage impactor.

The first stage impactor 26 is positioned in close proximity to the inlet of the probe 14, and is coaxial with the probe. The inlet 18 is provided with a tubular member or nozzle 32 which projects into the probe, and which has a flange 34 connected to its innermost end (note FIGS. 8 and 13). The flange 34 has a shoulder 36 which partially surrounds the outer edge, and a relatively flat top 38. A bracket 40 is attached to the top portion of the flange 34 by means of screws 42 and has a spring 44 attached to it by rivets 46.

A circular disc 48, for collecting the particulate material, is adapted to be mounted adjacent to the outlet of the nozzle 32. The disc 48 is positioned within a retaining ring 50 having a rounded inner edge 52, which acts as a baffle as the material flows into the probe through the nozzle 32 and the larger particles impact on the disc 48. The disc 48 is held within the ring 50 by means of a ring 54 having ears 55 thereon. The ring 50 is attached to a circular plate 56, by means of screws through the ears 55 and is spaced from the plate by spacers 58. The plate 56 has a U-shaped portion 60 removed therefrom, and two grooves 62 on its front surface (note FIG. 13). A shoulder 64 is provided within the U-shaped portion 60 and is adapted to engage the shoulder 36 on the flange 34. The plate 56 is attached to the nozzle 32 by mating it with the flange 34 until the ends of the spring 44 engage the grooves 62. Thus, even though the unit is assembled, the plate 56, ring 50 and disc 48 may be readily removed by pulling down on the plate 56 so that the ends of the spring 44 disengage the grooves 62.

As the particulate material is forced into the probe 14, it is collected by impaction on the disc 48. The amount and the size of particulate material collected on the disc 48 depends on a number of design factors, such as the diameter of the inlet nozzle 32, the distance that the disc 48 is spaced from the end of the nozzle 32, and the like.

Positioned between the first stage impactor 26 and the rear of the probe 14 is the second stage impactor 28. As noted above, this impactor unit is adapted to collect particulate material which is relatively smaller in size than that collected by the first stage impactor 26. The second stage impactor includes a support member, designated generally by reference numeral 66, which is securely attached to the band 136 by means of screws 68. The support member 66 has a cone-shaped inlet 70 which converges toward the rear of the probe, and terminates in a tubular portion or nozzle 72. Note that the nozzle 72 is not coaxial with the probe 14, but is eccentrically positioned relative thereto.

A circular member 74, which is integrally connected to the nozzle 72 and has an opening aligned therewith, provides a mounting for a ball bearing assembly designated by numeral 76 (note also FIGS. 11 and 14). Mounted for relative rotation with respect to the circular member 74 is a ring-shaped ratchet member 78, which is coaxial with the probe 14 and rotatable about the longitudinal axis of the probe. Integrally formed on the back portion of ratchet 78 is a U-shaped portion 80 provided with a shoulder 82, which forms a groove 84 with the member 80. Formed on the front edge of the ratchet 78 are a plurality of teeth 86. A leaf spring 88, which partially encircles the ratchet 78, is attached to the top of the portion 80; the spring 88 has detents 90 near the two ends.

A circular disc 92 is provided for collecing particulate material, and is adapted to be mounted adjacent the outlet of the nozzle 72, in a manner similar to that for disc 48. The disc 92 is positioned within a retaining ring 94 having a rounded inner edge 96 which acts as a baffle. The disc 92 is held within the ring 94 by means of a ring 98 having ears 99 thereon through which screws extend. The ring 94 is attached to a circular plate 100, by means of spacers 102. The plate 100 has a U-shaped portion 104 removed therefrom, similar in shape to portion 80, and has two opposed grooves 106 on its peripheral edge. A shoulder 108 is provided within the U shaped portion 104 and is adapted to be positioned within the groove 84 on the ratchet 78. The plate 100 is attached to the member 80 so that the detents 90 of spring 88 engage the grooves 106. Once the unit is assembled, the disc 92 is rotatable along with the ring member 78, about the longitudinal axis of the probe 14.

Figure 15:
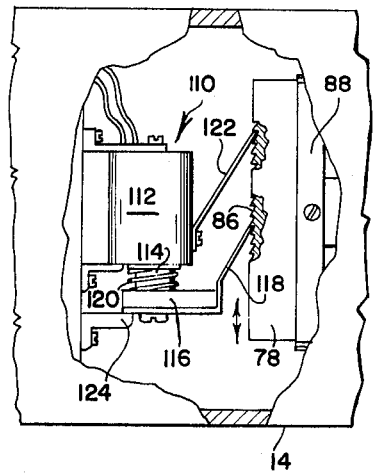
FIG. 15 is a partial sectional schematic view taken along line 15—15 of FIG. 6.

The ratchet 78 is rotated relative to the circular member 74 by means of a stepper mechanism designated generally by reference numeral 110, as best seen in FIGS. 6, 7 and 15. The stepper mechanism 110 includes a solenoid 112, which has a movable core 114 projecting therefrom, and which is attached to the support member 66 by suitable conventional means. Attached to the movable core 114 is a pawl 116, which has a portion 118 adapted to engage the teeth 86 on the ratchet 78. A spring 120 is mounted on the core 114 between the solenoid 112 and the pawl 116, and urges the pawl 116 away from the solenoid. As the solenoid 112 is energized, the pawl 116 is pulled toward the solenoid 112, and the ratchet 78 is rotated or stepped in a counterclockwise direction as seen from the front. When the solenoid 112 is de-energized, the spring 120 urges the pawl 116 away from the solenoid 112. A detent spring 122, which also engages the teeth 86 of ratchet 78, prevents the ratchet from rotating in a clockwise direction. An adjustable bracket 124 limits the relative movement of the core 114 and pawl 116 away from the solenoid 112.

Note that the diameter of the nozzle 72 is smaller than the diameter of the nozzle 32, and the distance of the disc 92 from the outlet of nozzle 72 is less than the distance of the disc 48 from the outlet of nozzle 32. In view of these design features, the second stage impactor 28 is adapted to collect particulate material which is smaller in size than that collected by the first stage impactor 26. The disc 92 is rotated as described above, in order to provide a larger area for collection of the particulate material on the disc. As also noted above, this rotation is accomplished by means of the stepper mechanism 110, which may be adjusted to rotate the disc 92 at any desired rate, for example, by adjusting the length of the stroke of the solenoid core 114 or by regulating the frequency of energizing the solenoid 112.

Positioned between the second stage impactor 28 and the rear of the probe 14 is the filter unit 30, which is used to collect particulate material not impacted on the first and second stage impactors. As shown in FIGS. 6, 7 and 12, the filter unit 30 is attached to the band 138 and includes a retaining ring 150, a screen 152, and a filter 154 positioned between the ring 150 and the screen 152. The filter unit 130 is abutted against the band 138 by means of a bracket 156 which is comprised of an upper member 158, attached to the band 138, and a lower member 160, which is hingedly connected to the upper member 158 (FIG. 12). The lower member 160 is provided with a hook 162 which is adapted to engage the ring 150. Note that the lower member 160 is eccentrically hinged to the member 158 so that it bears on the ring 150 when the bracket 156 is locked, thus urging the filter unit 30 against an O-ring 164 retained in an annular seat 166 in the band 138. The O-ring 164 provides a tight seal between the two members. The filter unit 30 may be readily removed or replaced by opening the lower member 160 of bracket 156 and pulling the unit 30 down and away from the band 138.

Positioned within the fuselage 12 of the airplane is a pump 168 which communicates with the interior of the probe 14 through a passage 170 in the support 16. The pump 168 aids in moving the particulate material through the probe 14, by creating a vacuum in a rear compartment 171 of the probe. It should be noted that in some circumstances the ram pressure, which is increased by the cowling 22 as noted above, might be sufficient to effectively move the aerosol through the probe, and augmentation by the pump 168 is unnecessary. For example, it might be desirable to use only one collection means, e.g., first stage impactor 26, and the ram pressure alone might be adequate to move the aerosol.

A closure member 172, located within the cowling 22, is provided for closing the entrance 18 into the probe 14, as shown in FIG. 1. The closure member 172 is hingedly mounted within the top surface of the cowling at 174 and when not in use, is adapted to be retained within a cavity or recess 176 formed in the cowling. The closure member 172 is pivoted about the pivot point 174 by a motor 178, which has an output gear 182 that meshes with a gear 184 formed as an integral part of the closure member 172.

The closure member 172 is provided so that the entrance into the probe might be closed at a desired time. For example, it might be desirable to close the entrance into the probe 14 as the airplane enters a cloud, or a rain shower. Actuation of the motor 178 may be accomplished by either manual or automatic control.

Attached to the rear edge of the cowling 22, also called the exit end of the cowling, is a flat ring 180. The ring 180 is provided so that the inlet velocity of the air into the probe 14 may be controlled by changing the exit area of the cowling 22. This is accomplished by placing the ring 180 at the shroud exit. In this way, a desired inlet velocity for proper performance of the first stage impactor 26 is accomplished, even though the relative speed of the airplane might be higher than that required by the impactor 26. It should be understood, however, that the radial dimension of the ring 180 may vary, depending upon the design of the impactor 26, the relative speeds involved, and the like.

The sampling device 10 is attached to the fuselage 12 of the airplane by means of the support members 16 and 24, so that the inlet end of the probe 14 faces toward the front of the airplane. As the airplane becomes airborne, the closure member 172 might be positioned over the inlet 18 of the probe 14 so that no particulate material is collected. After a desired speed is attained, and the region which is to be sampled is reached, the motor 178 is actuated and the inlet is opened by positioning the closure member 172 within the cavity 176.

The relative speed of the airplane may be considerably higher than the desired speed for proper performance of the first stage impactor 26 positioned within the probe 14; therefore, it is necessary to decrease the velocity of the inlet airstream to that required by the first stage impactor 26. For illustrative purposes, a velocity of approximately 400 feet per second for the airplane will be assumed, and a desired inlet velocity into the probe 14, for proper performance of the impactor 26, of approximately 160 feet per second will be assumed. These figures are arbitrary, and it is envisioned that other speeds might be effectively used as well. The deceleration of the inlet airstream is accomplished by positioning the cowling 22 over the inlet end of the probe 14; and as described above, the velocity of the inlet airstream can be regulated by varying the exit area of the cowling 22. The cowling 22 also controls the flow of the particulate material into the probe 14, so as to avoid particle size discrimination in the inlet airstream, by creating a uniform flow field within the cowling 22, as well as effectuating ram pumping.

As the particulate material is forced into the probe 14 by ram pressure, particles above a predetermined size are collected by impaction on the disc 48. For purposes of illustration, the first stage impactor might be designed to collect particles having a minimum size of 1.0 micron in diameter. The predetermined size is determined by such factors as the diameter of nozzle 32, the distance of the disc 48 from the end of the nozzle 32, and the like. Particles which are smaller than the minimum size do not have sufficient inertia to be impacted on the disc 48, therefore, they are deflected by the baffle 52 and follow the airstream into the second stage impactor 28.

As the air carrying the smaller particles flows into the nozzle 72 of the second stage impactor, it accelerates to a greater velocity, thereby causing particles within a relatively smaller predetermined size range to have sufficient inertia to become impacted on disc 92. For purposes of illustration, a size range between 0.3 and 1.0 micron in diameter might represent particles impacted on the disc 92. This size range is similarly determined by the diameter of nozzle 72, the distance of disc 92 from the end of nozzle 92, and the like.

The acceleration of the air is caused primarily by the design of the impactor 28; in other words, by sufficiently decreasing the diameter of the nozzle 72, a greater velocity of the moving air can be attained. Furthermore, the air expands in volume as it flows between the two impactors, and the density of the air decreases; the decrease in density also aids in increasing the velocity of the gas. Depending upon design characteristics, a velocity of the air of approximately 700 feet per second might be desired, although greater or lesser speeds might be usable as well.

After passage of the air through the second impactor, its velocity is greatly reduced, for example to 30 feet per second, and particles having a size below the prescribed minimum, which are not collected by impaction on disc 92, follow the airstream into the filter unit 30, where they are collected on the filter 154. The pump 168 aids in moving the air through the probe 14 by creating a vacuum in the compartment 171, as noted above. As the air flows through the pump, it is discharged into the airplane, or, if desired, into the atmosphere.

After the flight is completed, the discs 48 and 92, and filter 154 are removed from the probe 14, and analyzed in laboratories to determine the characteristics of the particulate material collected.

In the above description a disclosure of the principles of this invention is presented together with an embodiment of means by which the invention may be carried out. Of course, the invention is to be limited only by the scope of the appended claims.

What is claimed is:

1. A sampling device for collecting atmospheric debris comprising a tubular member having an inlet in one end, means located within said tubular member for collecting atmospheric debris as the debris flows through the inlet into said tubular member, and tubular cowling means surrounding and spaced from the inlet end of said tubular member for controlling the flow of the debris through the inlet into said tubular member to avoid particle size discrimination in the inlet airstream.

2. A sampling device for collecting atmospheric debris comprising a tubular member having an inlet in one end, means located within said tubular member for collecting atmospheric debris as the debris flows through the inlet into said tubular member, and means positioned at the inlet end of said tubular member for controlling the flow of the debris through the inlet into said tubular member to avoid particle size discrimination in the inlet airstream, said controlling means including a tubular cowling which surrounds the inlet end of the tubular member, said tubular cowling being coaxial with the tubular member and having an inlet end and an exit in its opposite end.

3. The combination of claim 2 wherein the internal dimension of the cowling is greater than the external dimension of the tubular member, and means are provided for positioning the inlet end of the tubular member within the exit end of said cowling.

4. The combination of claim 2 wherein means are provided for transporting the sampling device through the atmosphere.

5. The combination of claim 2 wherein a movable closure member is provided for opening and closing the inlet into said tubular member.

6. A particulate sampling device for collecting particulate material from an airstream comprising an aerodynamically-shaped tubular member having an inlet in the front end, at least one collection means located within said tubular member for collecting particulate material as said material flows through the inlet into said tubular member, and tubular cowling means surrounding the inlet end of said tubular member for controlling the flow of the particulate material through the inlet into said tubular member to avoid particle size discrimination in the inlet airstream.

7. The combination of claim 6 wherein the inlet includes a tubular conduit which projects into the tubular member, and the collection means includes an impactor unit positioned within close proximity to the inner end of the conduit, said impactor unit adapted to collect particulate material by impaction as said material flows through the conduit into the tubular member.

8. A particulate sampling device for collecting particulate material from an airstream comprising an aerodynamically-shaped tubular member having an inlet in the front end, said inlet including a tubular conduit which projects into the tubular member, first collection means located within said tubular member for collecting particulate material within a first prescribed size range, second collection means located within said tubular member for collecting particulate material within a second prescribed size range which is relatively smaller than the first size range, and tubular cowling means surrounding the inlet end of said tubular member for controlling the flow of the particulate material through the inlet into said tubular member.

9. The combination of claim 8 wherein the first collection means includes a first stage impactor unit positioned within close proximity to the inner end of said conduit adapted to collect particulate material by impaction, and the second collection means includes a second stage impactor unit positioned between the rear end of the tubular member and the first stage impactor unit adapted to collect particulate material by impaction.

10. A particulate sampling device for collecting particulate material from an airstream comprising in combination an aerodynamically-shaped tubular member having an inlet in the front end, said inlet including a tubular conduit which projects into the tubular member, an outlet in the rear portion of said tubular member, first collection means located within said tubular member for collecting particulate material within a first prescribed size range, second collection means located within said tubular member for collecting particulate material within a second prescribed size range which is relatively smaller than the first size range, third collection means located within said tubular member for collecting particulate material within a third prescribed size range which is relatively smaller than the second size range, and tubular cowling means positioned at the inlet end of said tubular member for controlling the flow of the particulate material through the inlet into the tubular member.

11. The combination of claim 10 wherein the first collection means includes a first stage impactor unit positioned within close proximity to the inner end of the conduit adapted to collect particulate material by impaction, the second collection means includes a second stage impactor unit positioned between the rear end of the tubular member and the first stage impactor unit adapted to collect particulate material by impaction, and the third collection means includes a filter unit positioned between the rear end of the tubular member and the second stage impactor unit adapted to collect particulate material by filtration.

12. The combination of claim 11 wherein pumping means is provided for assisting in the movement of the flow of the particulate material through the tubular member.

13. An airborne sampling device for collecting atmospheric debris comprising in combination an aerodynamically-shaped probe having an inlet in one end, means for attaching said probe to an airborne vehicle, means located within said probe for collecting atmospheric debris as said probe passes through the atmosphere, said means including at least one impactor unit adapted to collect said debris as said debris is forced into the probe by the relative movement of said probe through the atmosphere, and means for controlling the flow of debris into the probe so as to avoid particle size discrimination in the inlet airstream and to provide a predetermined velocity of flow of debris therethrough, said means including an aerodynamically-shaped cowling surrounding the inlet end of the probe, and means for positioning said probe so that its inlet end projects into said cowling.

14. A sampling device for collecting atmospheric debris comprising a tubular member having an inlet in one end, means located within said tubular member for collecting atmospheric debris as the debris flows through the inlet into said tubular member, means positioned at the inlet end of said tubular member for controlling the flow of the debris through the inlet into said tubular member to avoid particle size discrimination in the inlet airstream, said means being comprised of a tubular cowling which surrounds the inlet end of the tubular member, said cowling having an inlet in one end and an exit in its opposite end, the internal dimension of said cowling being greater than the external dimension of the tubular member, means for positioning the internal end of the tubular member within the exit end of said cowling, said exit end of said cowling and the inlet end of the tubular member forming an annular space between them, and means for controlling the velocity of the air flow into the inlet of the tubular member by regulating the dimension of said annular space.

15. A sampling device for collecting atmospheric debris comprising a tubular member having an inlet in one end, means located within said tubular member for collecting atmospheric debris as the debris flows through the inlet into said tubular member, means positioned at the inlet end of said tubular member for controlling the flow of the debris through the inlet into said tubular member to avoid particle size discrimination in the inlet airstream, said means being comprised of a tubular cowling which surrounds the inlet end of the tubular member, said cowling having an inlet in one end and an exit in its opposite end, and a movable closure member for opening and closing the inlet into said tubular member, said closure member being hingedly supported by the cowling, said cowling being provided with a recessed portion adapted to house the closure member when the inlet is open.

16. An airborne sampling device for collecting atmospheric debris comprising in combination an aerodynamically-shaped probe having an inlet in one end, means for attaching said probe to an airborne vehicle, means located within said probe for collecting atmospheric debris as said probe passes through the atmosphere, said means including at least one impactor unit adapted to collect said debris as said debris is forced into the probe by the relative movement of said probe through the atmosphere, means for controlling the flow of debris into the probe so as to avoid particle size discrimination in the inlet airstream and to provide a predetermined velocity of flow debris therethrough, said means including an aerodynamically-shaped cowling surrounding the inlet end of the probe, means for positioning said probe so that its inlet end projects into said cowling, and movable closure means for opening and closing the inlet into said probe, said closure means being hingedly supported by the cowling and adapted to be positioned within a recessed portion of said cowling when the inlet is open.

17. A particulate sampling device for collecting particulate material from an airstream comprising an aerodynamically-shaped tubular member having an inlet in the front end, said inlet including a tubular conduit which projects into the tubular member, first collection means located within said tubular member for collecting particulate material within a first prescribed size range, said first collection means including a first stage impactor unit having an axis, said first stage impactor unit being positioned within close proximity to the inner end of said conduit and being adapted to collect particulate material by impaction, second collection means located within said tubular member for collecting particulate material within a second prescribed size range which is relatively smaller than the first size range, said second collection means including a second impactor unit having an axis, said second impactor unit being positioned between the rear end of the tubular member and the first stage impactor unit as being adapted to collect particulate material by impaction, means for mounting one of the impactor units so that its axis is substantially coaxial with the tubular member, means for mounting the other unit so that its axis is not coaxial with the tubular member, said other unit including a rotatable portion, means for rotating said rotable portion, and tubular cowling means surrounding the inlet end of said tubular member for controlling the flow of the particulate material through the inlet into said tubular member.

(References on following page)

References Cited by the Examiner

UNITED STATES PATENTS

| | | | |
|---|---|---|---|
| 1,274,415 | 8/1918 | Hill | 73—28 |
| 2,468,021 | 4/1949 | Black | 73—28 |
| 2,645,940 | 7/1953 | Kohl et al. | 73—421.5 |
| 2,947,164 | 8/1961 | Orr | 73—28 |
| 3,011,336 | 12/1961 | Weiss | 73—421.5 X |

OTHER REFERENCES

Solnick: "Sampling Particulate Matter," Oil and Gas Journal, pages 120–124, Oct. 15, 1956.

Winternity et al.: "Sample Total Pressure Probes with Shields," Instrument Practice, pages 1072 to 1077, October 1958.

DAVID SCHONBERG, *Acting Primary Examiner.*
ROBERT EVANS, RICHARD QUEISSER, *Examiners.*
S. C. SWISHER, *Assistant Examiner.*